United States Patent [19]

Aoki

[11] Patent Number: 5,912,772
[45] Date of Patent: Jun. 15, 1999

[54] ZOOM LENS BARREL WITH CAM RING HAVING A HELICOID SURFACE

[75] Inventor: Nobuaki Aoki, Tokyo, Japan

[73] Assignee: Asahi Kogaku Kogyo Kabushiki Kaisha, Tokyo, Japan

[21] Appl. No.: 09/059,267

[22] Filed: Apr. 14, 1998

[30] Foreign Application Priority Data

Apr. 18, 1997 [JP] Japan .................................... 9-102005

[51] Int. Cl.$^6$ ............................................ G02B 15/14
[52] U.S. Cl. .................................... 359/701; 359/700
[58] Field of Search ................................ 359/699, 700, 359/701, 704, 706, 823, 829, 830

[56] References Cited

U.S. PATENT DOCUMENTS

| | | | |
|---|---|---|---|
| 5,231,449 | 7/1993 | Nomura | 354/485 |
| 5,467,227 | 11/1995 | Nomura | 359/694 |
| 5,469,300 | 11/1995 | Nomura | 359/700 |
| 5,488,513 | 1/1996 | Tanaka | 359/699 |
| 5,589,987 | 12/1996 | Tanaka | 359/701 |
| 5,636,064 | 6/1997 | Nomura et al. | 359/704 |
| 5,659,810 | 8/1997 | Nomura et al. | 396/72 |
| 5,701,208 | 12/1997 | Sato et al. | 359/822 |
| 5,748,388 | 5/1998 | Nomura et al. | 359/700 |

*Primary Examiner*—Georgia Epps
*Assistant Examiner*—Ricky Mack
*Attorney, Agent, or Firm*—Greenblum & Bernstein, P.L.C.

[57] ABSTRACT

A zoom lens barrel has a rotatable cam ring which is provided on an inner peripheral surface thereof with a female helicoid which can be engaged by a male helicoid formed on an outer peripheral surface of a lens support and a cam groove in which a cam follower pin formed on a lens frame can be fitted. At least a part of said cam groove penetrates in an area of said female helicoid in the axial direction of said cam ring. The cam ring is provided with a first area in which the female helicoid is formed and a second area separate from the first area, in which the cam groove is formed, so that the cam groove does not interfere with the female helicoid.

7 Claims, 5 Drawing Sheets

ZOOM LENS BARREL WITH CAM RING HAVING A HELICOID SURFACE

BACKGROUND OF THE INVENTION

1. Field of the Invention

The present invention relates to a zoom lens barrel.

2. Description of the Related Art

In a known zoom lens barrel, a rotatable cam ring is provided on the inner peripheral surface thereof with a female helicoid (internal thread) which engages with a male helicoid (external thread) of a lens support cylinder which supports one of the front and rear lens groups and includes a bottomed cam groove in which a cam follower (pin) provided on a lens frame of the other lens group is fitted. If a helicoid is provided on the front lens group, resistance to external shock is increased and deviation of the lens from the optical axis can be prevented.

In a known zoom lens barrel, the bottomed cam groove penetrates in an area of the female helicoid in the axial direction of the cam ring. Therefore, the depth of the cam groove has to be deeper than the depth of the thread-groove of the female helicoid, and the thickness of the cam ring has to be determined taking into account the diameter of the female helicoid and the depth (diameter) of the cam groove, and consequently, hindering possible miniaturization of the lens barrel. Moreover, recent lens shutter type cameras have reached their limit, necessitating even smaller lens barrels.

It is possible to miniaturize a classic type lens barrel in which the cam ring has no female helicoid thereon and instead is provided with cam grooves for two or more lens frames. However, the classic type lens barrel has the drawback of insufficient resistance to external shock and the lens has the tendency to deviate or incline with respect to the optical axis.

SUMMARY OF THE INVENTION

It is an object of the present invention to provide a cam ring mechanism which can make a zoom lens barrel small, in which the rotatable cam ring is provided on the inner peripheral surface thereof with a female helicoid which is engaged by a male helicoid formed on the outer peripheral surface of a lens support cylinder and a cam groove in which a cam follower pin provided on another lens frame is fitted, wherein at least a part of the cam groove penetrates in an area of the female helicoid in the axial direction of the cam ring.

To achieve the object mentioned above, according to the present invention, there is provided a zoom lens barrel having a rotatable cam ring which is provided on an inner peripheral surface thereof with a female helicoid which can be engaged by a male helicoid formed on an outer peripheral surface of a lens support and a cam groove in which a cam follower pin formed on a lens frame can be fitted. At least a part of the cam groove penetrates in an area of the female helicoid in the axial direction of the cam ring. The cam ring is provided with a first area in which the female helicoid is formed and a second area separate from the first area, in which the cam groove is formed, so that the cam groove does not interfere with the female helicoid.

The depth of the root of the female helicoid can be substantially identical to the depth of the cam groove. Preferably, the lens support is a front lens group support cylinder, and the lens frame having the cam follower pin which can be fitted in the cam groove is a rear lens group frame.

The cam ring can be provided on the outer peripheral surface thereof with a male helicoid which can be engaged by a female helicoid formed on a stationary barrel of a camera. Consequently, when the cam ring is rotated, the axial movement of the cam ring takes place.

According to another aspect of the present invention, there is provided a zoom lens barrel having a rotatable cam ring which is provided on an inner peripheral surface thereof with a female helicoid which can be engaged by a male helicoid formed on an outer peripheral surface of a lens support and a cam groove in which a cam follower pin formed on a lens frame can be fitted. At least a part of the cam groove penetrates in an area of the female helicoid in the axial direction of the cam ring. The female helicoid is provided on a portion of the cam ring in which no interference with the cam groove occurs.

The present disclosure relates to subject matter contained in Japanese Patent Application No. 9-102005 (filed on Apr. 18, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 3:
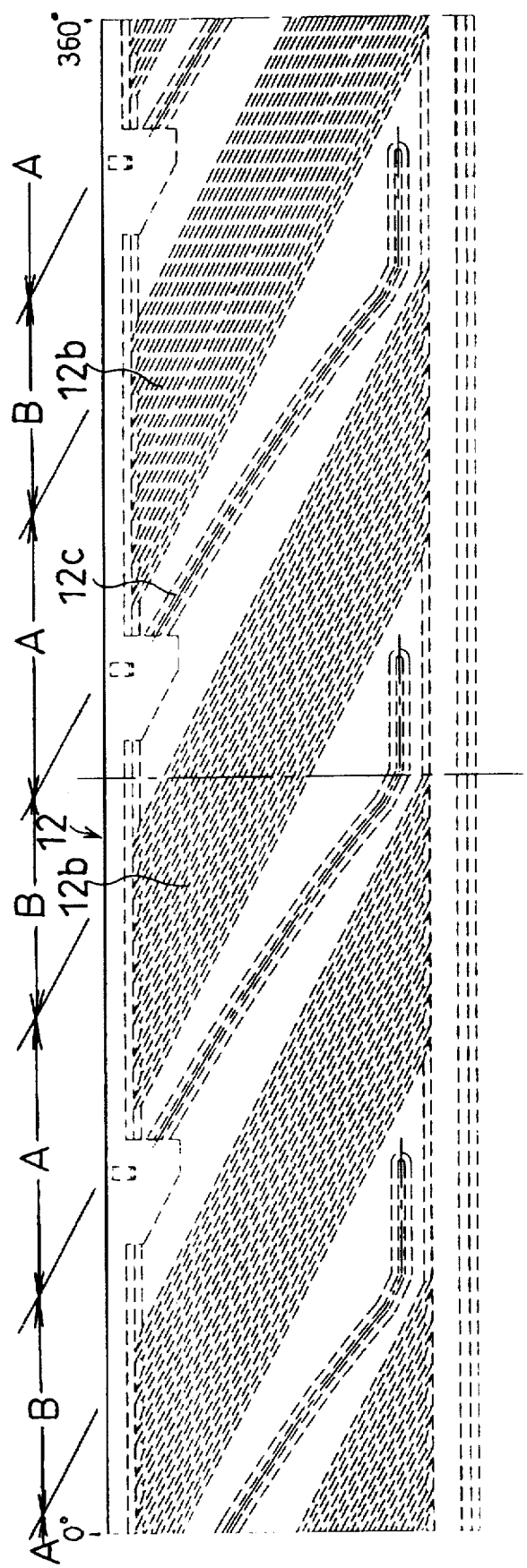
FIG. 3 is a developed view of a cam ring in a zoom lens barrel shown in FIG. 1.
Figure 6:
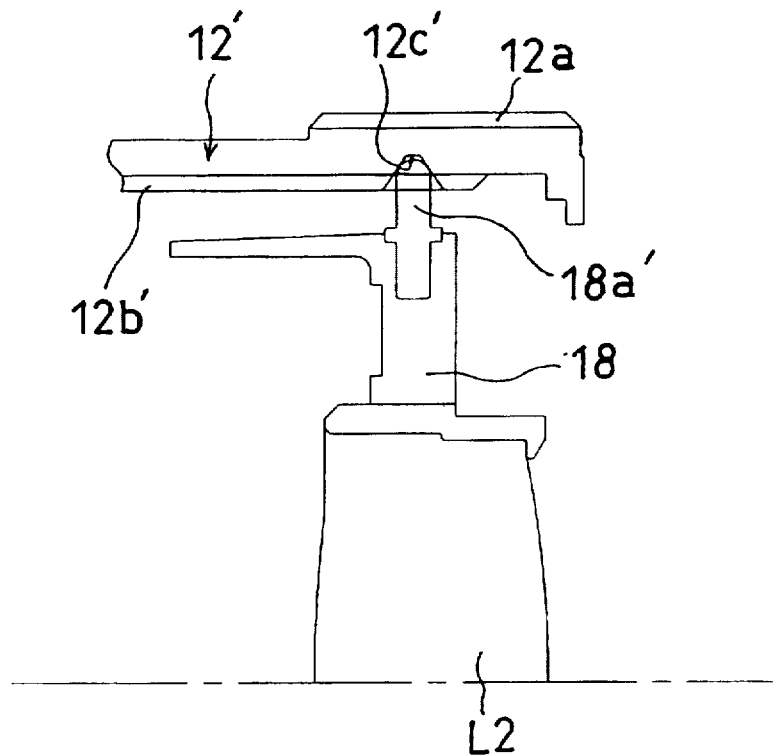
FIG. 6 is a longitudinal sectional view of an upper half of a cam ring and a cam follower pin shown in FIG. 5, corresponding to FIG. 4.
Figure 4:
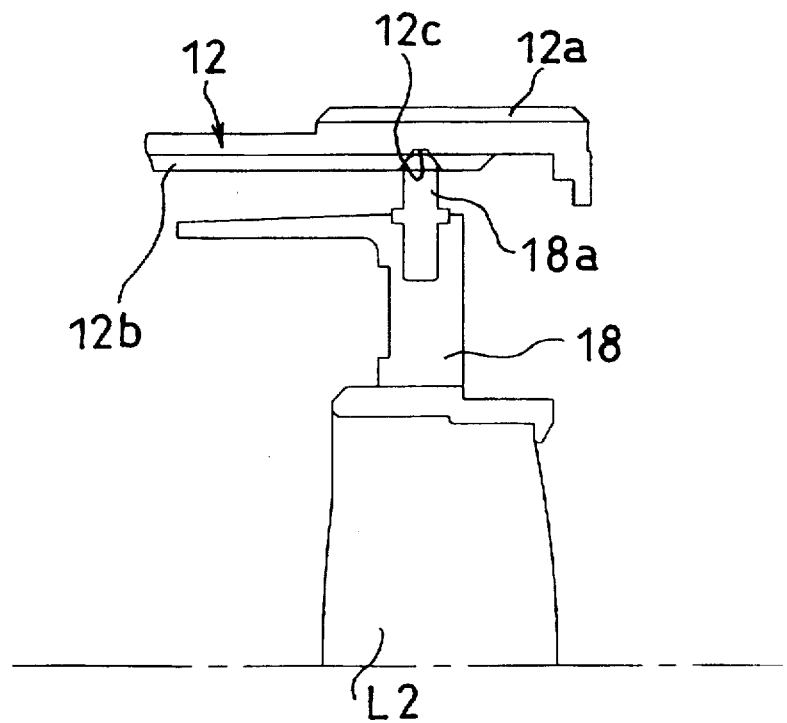
FIG. 4 is a longitudinal sectional view of an upper half of a cam ring and a cam follower pin, shown in FIG. 1.
Figure 5:
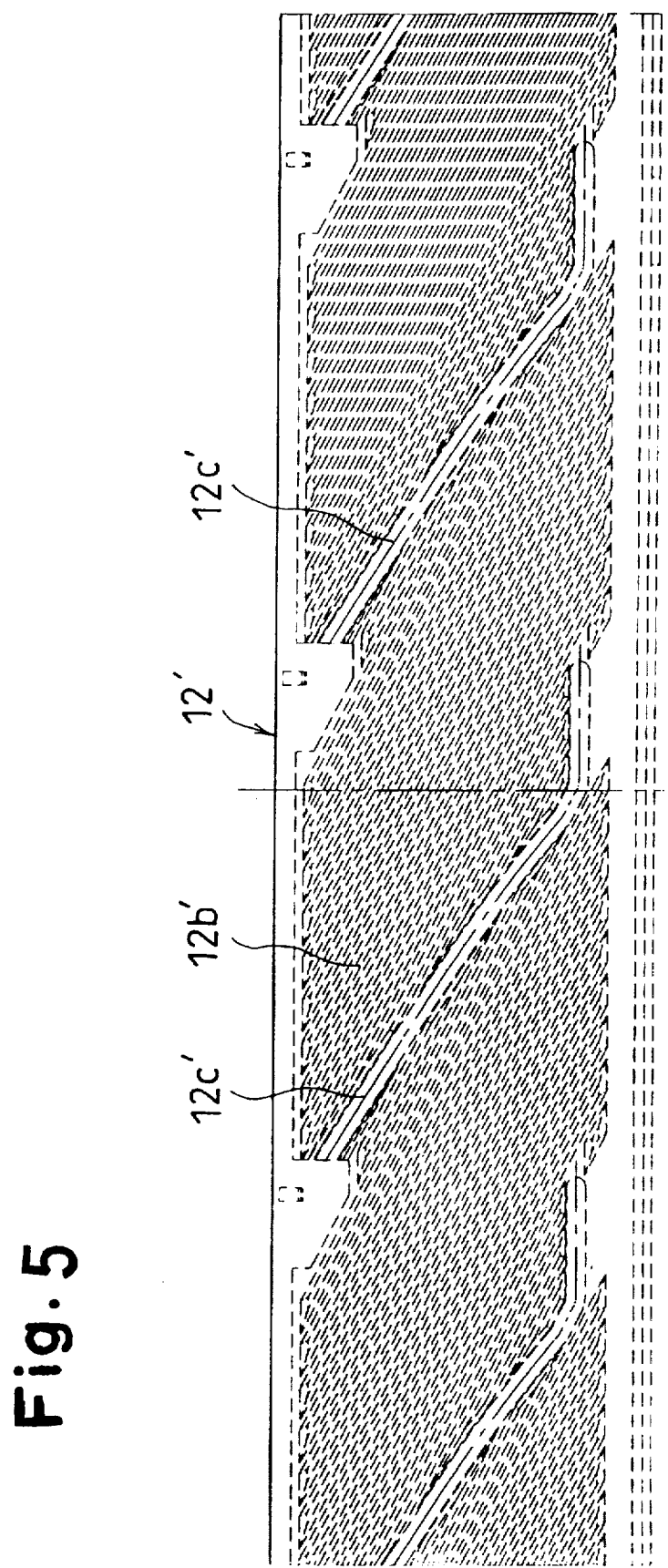
FIG. 5 is a developed view of a known cam ring, corresponding to FIG. 3, for comparison.

FIGS. 1 through 4 show an embodiment of a zoom lens barrel according to the present invention. FIGS. 5 and 6 show a known zoom lens barrel for comparison.

A stationary barrel 11 secured to a camera body is provided on the inner peripheral surface thereof with female helicoid (internal threads) 11a which are engaged by male helicoid (external threads) 12a formed on the outer peripheral surface of a cam ring 12. The cam ring 12 is rotated by a drive means (not shown). When the rotation of the cam ring 12 occurs, the cam ring 12 is moved in the optical axis direction through the engagement between the female and male helicoid 11a and 12a.

The cam ring 12 is provided on the inner peripheral surface thereof with female helicoid (internal threads) 12b and bottomed cam grooves 12c. FIG. 3 shows the arrangement of the female helicoid 12b and the bottomed cam grooves 12c. The identical non-linear cam grooves 12c are provided between the adjacent helicoid 12b. Namely, cam groove forming areas "B" parallel with the threads (roots) of the female helicoid 12b are formed between the female helicoid forming areas "A" which define the female helicoid 12b. The cam grooves 12c are located in the cam groove forming areas "B" and do not extend across the female helicoid 12b so as not to interfere with the female helicoid 12b. Boundaries of the first areas "A" and second areas "B" are defined by the outermost thread of the female helicoid 12b in a circumferential direction. In other words, the shape and the positions of the bottomed cam grooves 12c are first determined and thereafter, the position of the female helicoid 12b is determined so as not to interfere with the bottomed cam grooves 12c. The depth of the roots of the female helicoid 12b is substantially identical to the depth of the cam grooves 12, as can be seen in FIG. 4.

A front lens support cylinder 13 is fitted in the cam ring 12 and is provided on the outer peripheral surface with male helicoid (external threads) 13a which are engaged by the female helicoid 12b. The male helicoid 13a are circumferentially spaced from one another, corresponding to the female helicoid 12b.

A linear movement guide ring 14 is fitted in the rear end of the cam ring 12 to relatively move. The linear movement guide ring 14 is provided with a linear movement guide plate 15 secured thereto by screws 16. The linear movement guide plate 15 is provided with radial projections 15a which are fitted in linear movement guide grooves (not shown) formed in the stationary barrel 11 and extending in the optical axis direction, so that the linear movement guide ring 14 can be linearly moved without rotating. The cam ring 12 is equipped with a rear end flange 12d which is held between the linear movement guide ring 14 and the linear movement guide plate 15, so that the flange 12d (the cam ring 12) is rotatable relative to the linear movement guide ring 14 and move together with the linear movement guide ring 14 in the optical axis direction. In other words, the linear movement guide ring 14 is a member which is rotatable relative to, but movable in the optical axis direction together with, the cam ring 12.

Figure 1:
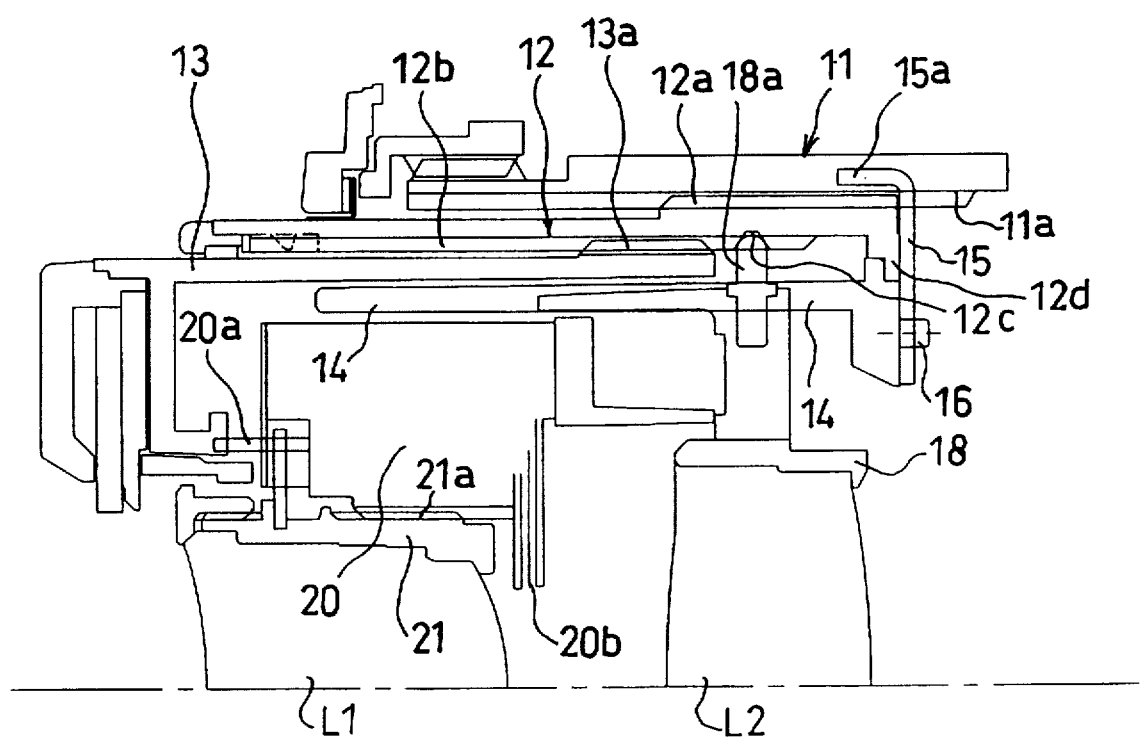
FIG. 1 is a longitudinal sectional view of an upper half of a zoom lens barrel, according to the present invention.
Figure 2:
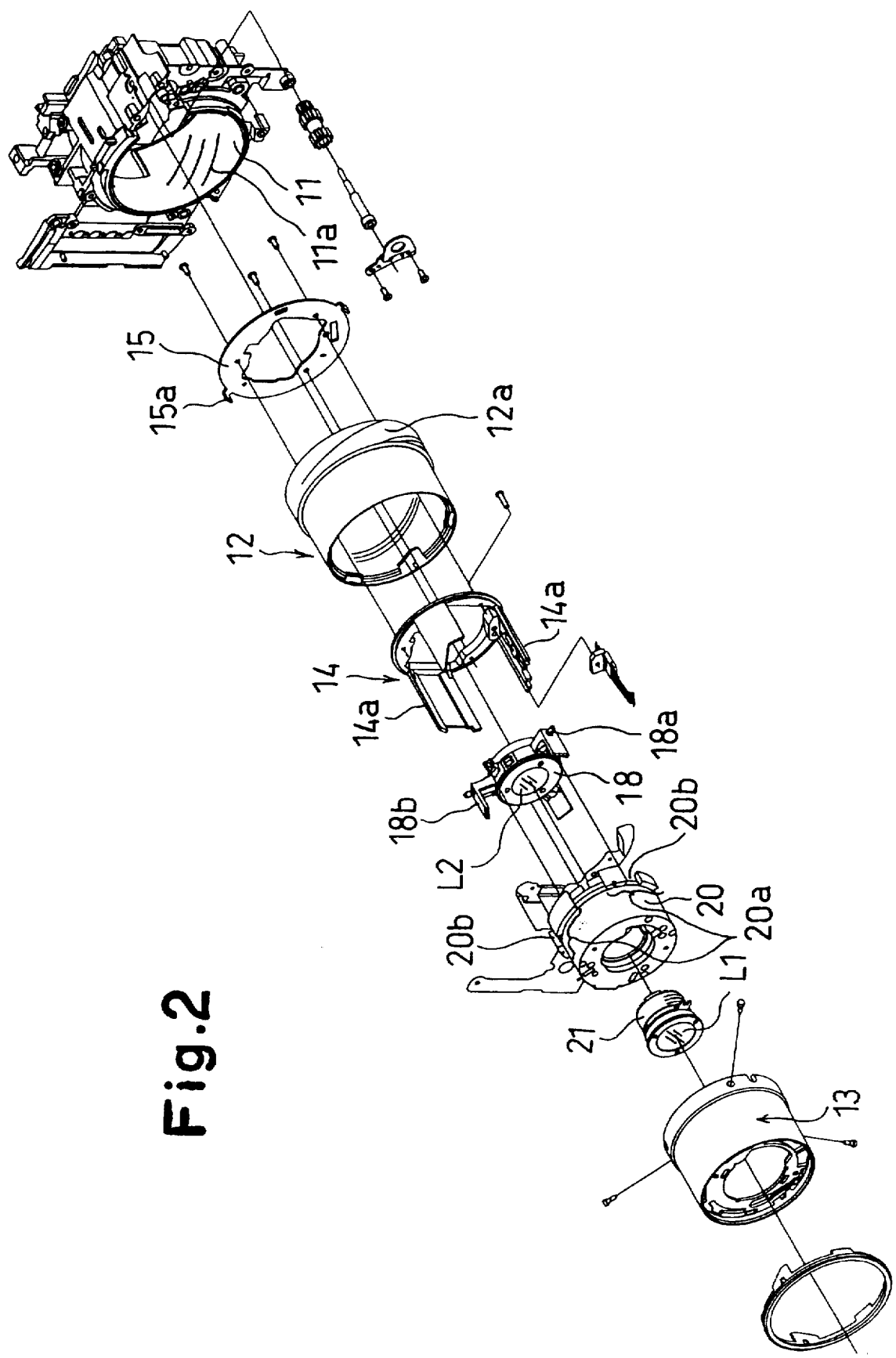
FIG. 2 is an exploded perspective view of a zoom lens barrel shown in FIG. 1.

The linear movement guide ring 14 restricts the movement of the front lens support cylinder 13 and the rear lens frame 18 to be movable only in the optical axis direction. Namely, the linear movement guide ring 14 is provided with a plurality of linear movement guide surfaces 14a (FIG. 2). The front lens group support cylinder 13 is equipped with a shutter unit 20 secured thereto, which is in turn provided with radial projections 20a that are fitted between the linear movement guide surfaces 14a. The radial projections 20a are provided with linear movement guide grooves 20b in which linear movement guide surfaces 18b of the rear lens group frame 18 are fitted. With this engagement, the linear movement guide ring 14, the front lens group support cylinder 13 (shutter unit 20) and the rear lens group frame 18 are moved in the optical axis direction without rotating.

The shutter unit 20 is provided with a threaded hole in which the helicoid 21a of the outer helicoid frame 21 of the front lens L1 is engaged. The shutter unit 20 drives the drive pins 20a in a circumferential direction by an angle corresponding to the object distance to thereby rotate the outer helicoid frame 21. The outer helicoid frame 21 moves in the axial direction while rotating in accordance with the helicoid 21a thereof, to thereby carry out the focusing operation by the front lens group L1. The shutter blades 20b are opened and closed in accordance with object brightness data.

The rear lens group frame 18 is provided with a plurality of cam follower pins 18a which project in the radial direction and which are fitted in the bottomed cam grooves 12c of the cam ring 12.

In a zoom lens barrel constructed as detailed above, when the cam ring 12 is rotated, the axial movement thereof occurs due to the engagement between the male and female helicoid 11a and 12a. The rotation of the cam ring 12 causes the shutter unit 20 (front lens group support cylinder 13) which is guided by the linear movement guide ring 14 to move in the optical axis direction while rotating relative to the cam ring 12 in accordance with the engagement of the female and male helicoid 12b and 13a. Simultaneously, the rear lens group frame 18 which is guided by the shutter unit 20 is moved through the bottomed cam grooves 12c in the optical axis direction along a predetermined track which is determined by the profile of the cam groove 12c. Namely, when the cam ring 12 rotates, the front lens group support cylinder 13 is linearly moved and the rear lens group frame 18 is non-linearly moved through the cam grooves 12c with respect to the angular displacement of the cam ring 12. Consequently, the distance between the front lens group L1 and the rear lens group L2 is varied in accordance with a predetermined track to perform the zooming operation. When the shutter release signal is generated, the drive pins 20a of the shutter unit 20 are circumferentially moved by an angular displacement corresponding to the object distance to perform the focusing operation. Consequently, the shutter blades 20b are opened and closed in accordance with the object brightness data.

The basic operation of the zoom lens barrel discussed above is the same as that of the conventional zoom lens barrel. However, in the present invention, the female helicoid 12b and the cam grooves 12c of the cam ring 12 are provided in the female helicoid forming areas "A" and the cam groove forming areas "B", respectively, and hence no interference therebetween occurs. Thus, it is possible to make the depth of the female helicoid 12b, for example, identical to the depth of the cam grooves 12c, in order to reduce the diameter of the cam ring 12, thus leading to a miniaturization of the entire zoom lens barrel.

FIGS. 5 and 6 show female helicoid 12b' and cam grooves 12c' of a conventional cam ring 12', corresponding to those of the cam ring 12 of the present invention shown in FIGS. 3 and 4. As can be seen in FIG. 5, the bottomed cam grooves 12c' extend across the female helicoid 12b'. In other words, the female helicoid 12b' are cut by the cam grooves 12c', so that the female helicoid 12b' and the cam grooves 12c' interfere with each other. Therefore, the depth of the cam grooves 12c' must be greater than the depth of the roots of the female helicoid 12b', as shown in FIG. 6. Consequently, the cam ring 12 is large in diameter (or thick). Comparing FIGS. 3, 4 and FIGS. 5, 6, it is apparent that the cam ring 12 of the present invention can be smaller in diameter (or thinner) than the conventional cam ring 12'. The molding dies which are used to mold the cam ring 12 from resin material can be simplified, thus resulting in a reduction of the production cost.

In the illustrated embodiment, the cam ring 12 is moved in the optical axis direction while rotating. This structure is advantageous to produce a large axial movement of the lens groups. However, the present invention can be applied to a cam ring which is only rotated without moving in the axial direction. Although the depth of the female helicoid 12b is approximately identical to the depth of the thread-grooves of the bottomed cam grooves 12c in the illustrated embodiment, it is possible for example to make the roots of the female helicoid 12b deeper than the cam grooves 12c.

Moreover, although the cam grooves 12c are non-linear in the illustrated embodiment, the present invention can be applied to a linear cam groove (lead groove) which is inclined at an angle different from the female helicoid 12b.

In the specification, the member having the male helicoid which can be engaged by the female helicoid formed on the inner peripheral surface of the cam ring is referred to as a "lens support cylinder", and the member having the cam follower pins which can be fitted in the bottomed cam grooves of the cam ring is referred to as a "lens frame". However, these elements are not limited to a cylinder and a frame, respectively. Furthermore, the term "lens support cylinder" and the "lens frame" can be replaced with, for example, a "cylinder" and a "frame" or other terms, respectively.

As can be understood from the above discussion, according to the present invention, since the female helicoid which can be engaged by the male helicoid formed on the outer peripheral surface of a lens frame and the cam grooves in which the cam follower pins provided on another lens frame are provided on the inner peripheral surface of the rotatable cam ring so that at least part of the cam groove penetrates in an area of the female helicoid in the axial direction of the cam ring, the diameter (thickness) of the cam ring can be reduced and thus the diameter of the lens barrel can be reduced.

What is claimed is:

1. A zoom lens barrel comprising:

a rotatable cam ring;

a lens support having a male helicoid formed on an outer peripheral surface thereof; and a lens frame having a cam follower pin provided on an outer peripheral surface thereof;

wherein said rotatable cam ring is provided on an inner peripheral surface thereof with a female helicoid which is engaged by said male helicoid of said lens frame and a cam groove in which said cam follower pin of said lens frame is fitted, wherein at least a part of said cam groove penetrates in an area of said female helicoid in the axial direction of said cam ring, and wherein said female helicoid of said cam ring is provided in a first area and said cam groove is provided in a second area which is separate from said first area, so that the cam groove does not interfere with the female helicoid.

2. A zoom lens barrel according to claim 1, wherein the depth of the root of the female helicoid is substantially identical to the depth of the cam groove.

3. A zoom lens barrel according to claim 1, wherein the lens support is a front lens group support cylinder and the lens frame is a rear lens group frame.

4. A zoom lens barrel according to claim 1, wherein said cam ring is provided on the outer peripheral surface thereof with a male helicoid which is engaged by a female helicoid formed on a stationary barrel of a camera.

5. A zoom lens barrel according to claim 1, wherein a boundary of said first area and second area is defined by the outermost thread of the female helicoid in a circumferential direction.

6. A zoom lens barrel having a rotatable cam ring which is provided on an inner peripheral surface thereof with a female helicoid which is engageable by a male helicoid formed on an outer peripheral surface of a lens support and a cam groove in which a cam follower pin formed on a lens frame is fitted, wherein at least a part of said cam groove penetrates in an area of said female helicoid in the axial direction of said cam ring, and wherein said female helicoid is provided on a portion of the cam ring in which no interference with the cam groove occurs.

7. A zoom lens barrel comprising:

a stationary barrel having a female helicoid;

a rotatable cam ring having a male helicoid which is engaged with said female helicoid of said stationary barrel;

a lens support which supports a front lens group, said lens support having a male helicoid; and a lens frame which supports a rear lens group, said lens frame having a cam follower pin protruding therefrom in a radial direction;

wherein said rotatable cam ring is provided with a female helicoid which is engaged by said male helicoid of said lens frame and a cam groove in which said cam follower pin of said lens frame is fitted, and wherein said female helicoid of said cam ring is formed in a first area, boundaries of which are a pair of outermost threads of said female helicoid and said cam groove is provided in a second area which is defined by said boundaries and does not contain the thread of said female helicoid, so that the cam groove does not interfere with the female helicoid.

* * * * *